(12) United States Patent
Léone et al.

(10) Patent No.: US 7,500,643 B2
(45) Date of Patent: Mar. 10, 2009

(54) CABLE CONNECTOR

(75) Inventors: Yvan Léone, Montreal (CA); Alain Michaud, Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 68 days.

(21) Appl. No.: 11/699,614

(22) Filed: Jan. 30, 2007

(65) Prior Publication Data

US 2008/0179469 A1  Jul. 31, 2008

(51) Int. Cl.
*F16L 5/00* (2006.01)

(52) U.S. Cl. ........................................ 248/56

(58) Field of Classification Search .................. 248/56, 248/316, 74.4–74.5; 174/153 G; 24/116 PB, 24/116 R; 439/460, 424
See application file for complete search history.

(56) References Cited

U.S. PATENT DOCUMENTS

| | | | |
|---|---|---|---|
| 3,249,687 A | 5/1966 | Klumpp, Jr. | |
| 3,464,659 A | 9/1969 | Klumpp, Jr. et al. | |
| 3,493,205 A * | 2/1970 | Bromberg | ................. 248/56 |
| 3,788,582 A * | 1/1974 | Swanquist | ................. 248/56 |
| 3,889,909 A | 6/1975 | Koscik | |
| 3,953,665 A | 4/1976 | Nicholson | |
| 4,000,875 A | 1/1977 | Jemison et al. | |
| 4,095,765 A * | 6/1978 | Aimar | ................. 248/56 |
| 4,108,507 A | 8/1978 | Renner et al. | |
| 4,180,227 A * | 12/1979 | Gretz | ................. 248/56 |
| 4,190,222 A | 2/1980 | Appleton et al. | |
| 4,289,288 A | 9/1981 | Gransberry et al. | |
| 4,350,839 A | 9/1982 | Lass | |
| 4,369,944 A | 1/1983 | Hobart, Jr. | |
| 4,493,467 A | 1/1985 | Borja | |
| 4,568,047 A | 2/1986 | Matsui | |
| 4,669,688 A | 6/1987 | Itoh et al. | |
| 4,892,979 A | 1/1990 | Rossow | |
| 5,230,489 A | 7/1993 | White et al. | |
| 5,243,139 A | 9/1993 | Law | |
| 5,374,017 A | 12/1994 | Martin et al. | |
| 5,445,538 A * | 8/1995 | Rodrigues et al. | ............ 439/460 |
| 5,675,128 A * | 10/1997 | Simon | ................. 174/152 G |
| D389,052 S * | 1/1998 | Yamamoto | ............... D8/396 |
| 6,742,223 B1 * | 6/2004 | Chang | ................. 24/16 R |
| 7,306,476 B2 * | 12/2007 | Gerlich et al. | ............ 439/394 |

* cited by examiner

*Primary Examiner*—Alexander Gilman
(74) *Attorney, Agent, or Firm*—Hoffman & Baron, LLP

(57) ABSTRACT

A cable connector having a generally tubular shape with a frontal portion and a rear portion is provided. The frontal portion is on a plane perpendicular to an axis with an undivided annular structure having an outer semi-conic wing that secures the cable connector to a knock-out opening prior to a cable insertion therein and an inner receptacle structure for receiving a cable in a direction that is parallel to the axis. A rear grasping portion separated into a pivoting rigid latch segment with a tightening handle for clasping against a fixed slot segment with a releasing handle for grasping the inserted cable is also provided.

15 Claims, 8 Drawing Sheets

CABLE CONNECTOR

FIELD OF THE INVENTION

The present invention relates to the installation of electrical conductors to junction boxes. More particularly, the present invention relates to a cost-effective unitary undivided cable connector that can be easily installed on a junction box, which provides protection from the external environment for the junction box while retaining a cable, a wire, or a plurality thereof in a strain-relief manner.

BACKGROUND OF THE INVENTION

Connectors providing strain relief to cables or wires in a junction box are known. Examples are shown in U.S. Pat. No. 4,892,979 to Rossow, U.S. Pat. No. 3,889,909 to Koscik, and U.S. Pat. No. 3,788,582 to Swanquist. However, these devices are designed to provide strain relief of the cable, and do not necessarily provide an environmental protection from dust and debris for the junction box itself.

The Rossow '979 reference, in particular, discloses two embodiments designed to provide functionality for adding additional wires to an existing connector assembly. In one embodiment, a cable is fastened to the bottom of a ring member having upper annular ridges provided at a distance away from the cable. This allows additional cables or wires to be added into the ring at a later time. However, this design leaves a gap between the cables and the upper annular ridges.

The other embodiment of the Rossow '979 reference discloses a break-away wedging member which partially encloses the opening. However, the wedging member does not effectively protect the inner junction box at the end of the opening. As the breakaway leaves the corners at the ends open, dusts, debris and other particulates may enter the junction box. In addition, both embodiments require assembly of the frontal portion before being inserted into the junction box, making its usage awkward and difficult. Furthermore, even the fastening serrated wrap member needs to be navigated through a tiny hole on the other side and does not allow a necessary simple clasping solution out in the field.

Likewise, the device of the Koscik '909 reference does not provide any protection for the gap between the ring and the cable. The Swanquist '582 reference requires a specific dimension cable for insertion into the rectangular passage, after which the electrician would rotate a cam portion to secure the cable to the connector and anchor the connector body to the box.

There is a need for a cable connector which can be fabricated unitarily in a cost-effective economical manufacturing process. It would also be preferable for such cable connector construction to allow easy insertion into a junction box knock-out opening without requiring any pre-assembly inconvenience either prior to installation or at the time of manufacture. Further, a need exists for a cable connector which can accommodate different dimension cables in a simple to use, remove and reuse convenient fastening mechanism. In addition, a cable connector which provides environmental protection for the inside of the junction box is also preferred.

SUMMARY OF THE INVENTION

In the particular embodiment shown and described herein, the invention provides for an apparatus that has a frontal portion provided on a plane perpendicular to an axis with a readily insertable undivided annular structure. The frontal portion has an outer protuberance that secures a cable connector to a knock-out aperture hole prior to a cable insertion therein. The apparatus also has an inner passageway structure for passing a cable in a direction that is parallel to the axis. Furthermore, the apparatus includes a rear grasping portion separated into a pivoting rigid latch segment with a tightening handle for clasping against a fixed slot segment with a releasing handle for grasping the inserted cable.

Preferably, the apparatus also includes a cuneus provided along the inner perimeter of the latch segment and another cuneus provided on the slot segment, which cooperate with each other to clasp the inserted cable. More preferably, the outer protuberance may be divided into a flexible solid wing and a non-flexible elongated wing with a recess carved therein and two rigid surfaces to provide rigidity to the elongated wing during insertion into the knockout hole.

Other objects and features of the invention will be evident from the following detailed description of the preferred embodiments and practices included in the invention and from the drawings herewith.

BRIEF DESCRIPTION OF THE DRAWINGS

FIG. 6 is a cross-sectional view along the plane X-X in FIG. 4 with a cable passing through;

DETAILED DESCRIPTION OF PREFERRED EMBODIMENTS

Figure 1:
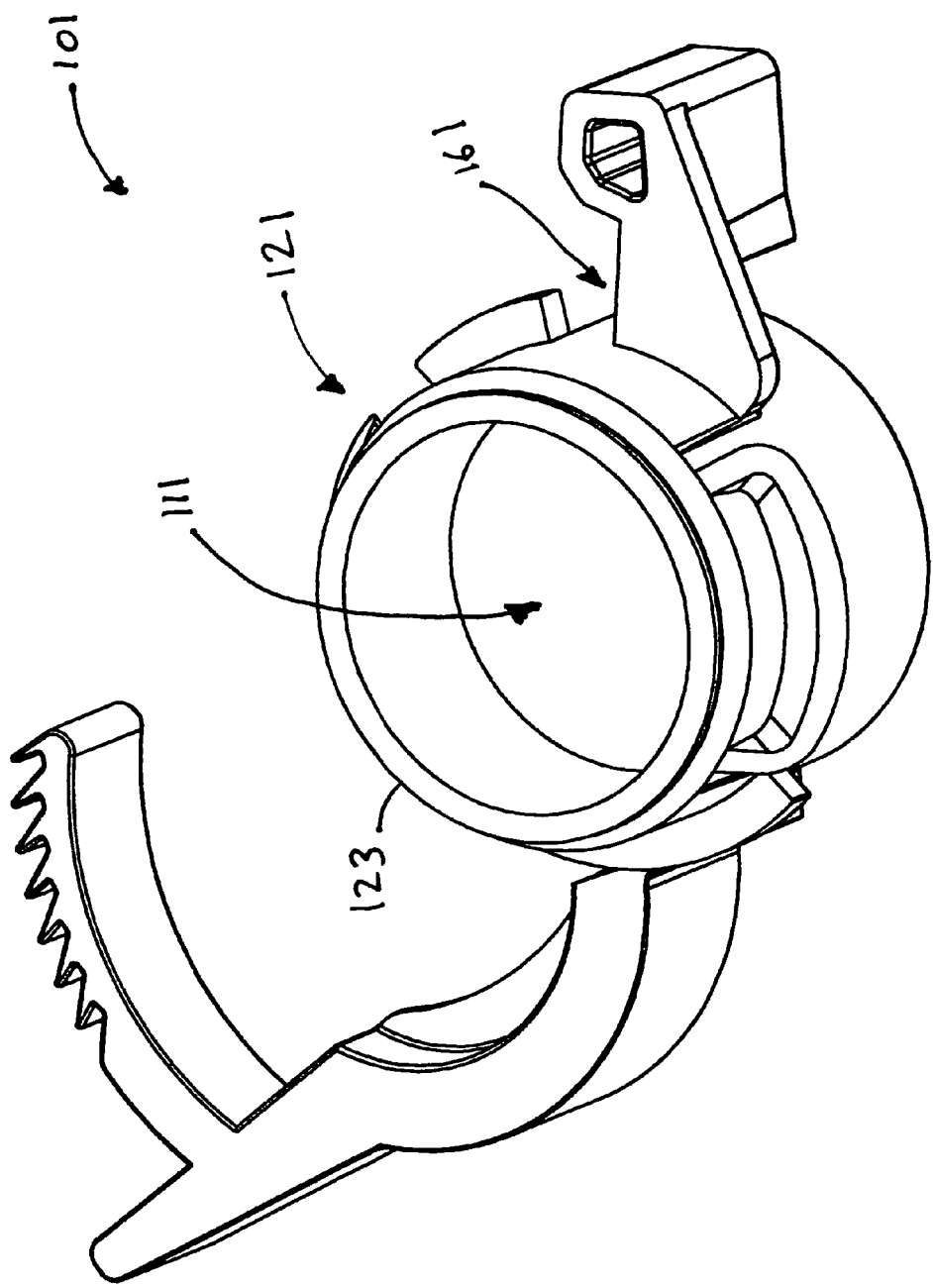
FIG. 1 is a front perspective view of a preferred embodiment of the cable connector of the present invention shown with the rear pivoting segment in an open position.
Figure 6:
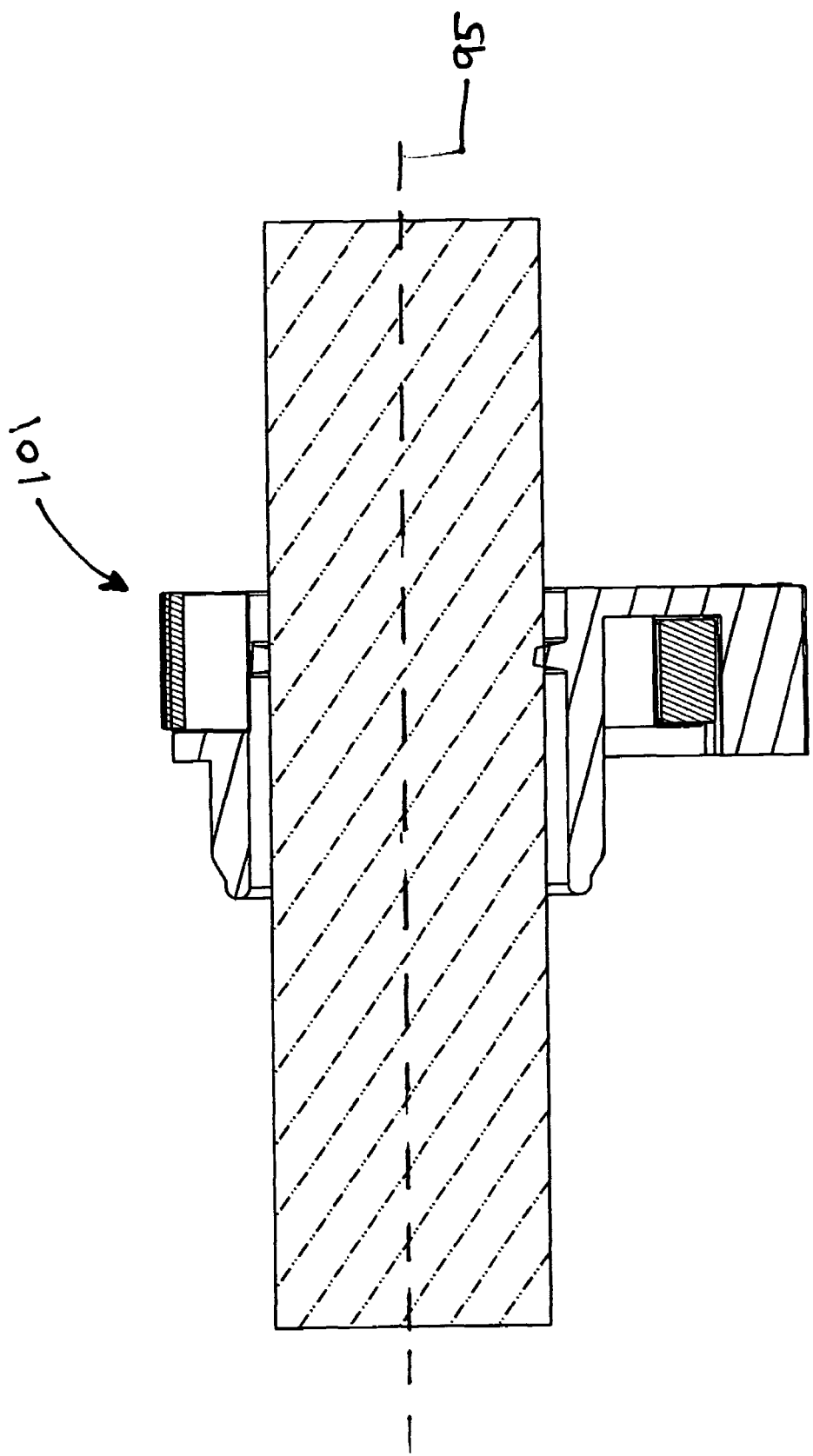

Referring to the FIG. 1, a preferred embodiment of the present invention shows a generally tubular cable connector body 101 which is annular in shape. The cable connector body 101 defines a central cross bore passageway 111 for accommodating a non-metallic sheathed cable 99 through the cable connector body 101 in a direction along axis 95 (FIG. 6).

The cable connector body 101 includes two main parts: a front mounting end 121 adapted to protrude from a knock-out opening of an electrical protective enclosure or a junction box, and a rear fastener end 161 opposite of the mounting end 121 for engaging a wire, a cable or a plurality thereof.

As can be seen on FIG. 1, the mounting end 121 includes an undivided frontal annular portion 123. This undivided frontal annular portion 123 is insert-ready and allows the user to secure the cable connector body 101 into a knock-out opening prior to inserting the cable into the bore 111. Thus, it effectively removes any pre-assembly requirement.

Figure 2:
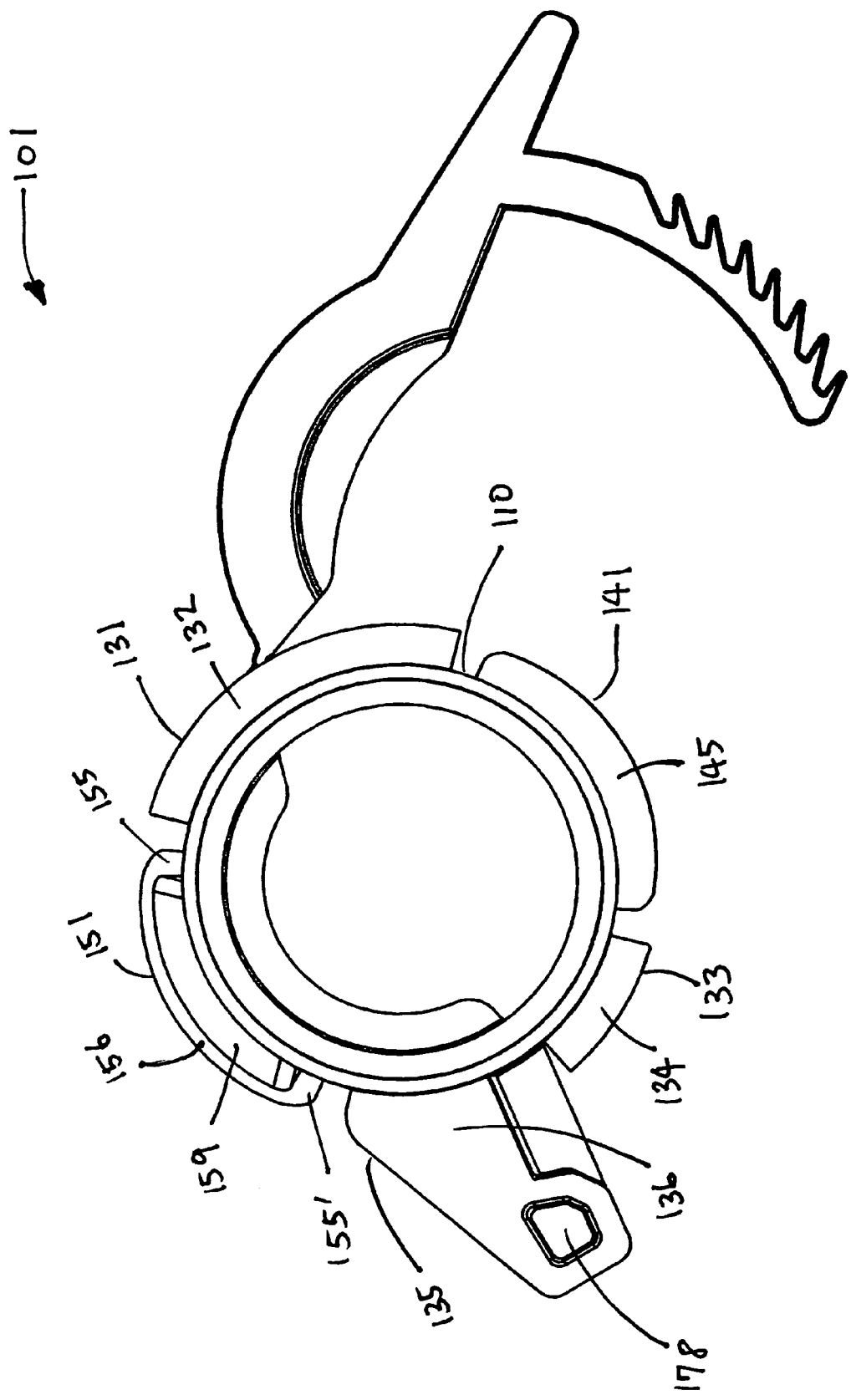
FIG. 2 is a front plan view of the preferred embodiment as shown in FIG. 1.

Different parts of the mounting end 121 shall be described with respect to FIG. 2. The outer exterior body surface 110 defines the exterior of both, the mounting end 121 and fastener end 161, on the opposite side of the bore 111. At a location adjacent to the annular portion 123, a flexible semi-conic wing 141 with a thin profile is integrally molded together with the connector body 101. This flexible semi-conic wing 141 includes an inclined surface 145 extending at a slope away from both the annular portion 123 and the body surface 110. As can be seen on FIG. 7, the particularly thin extending profile of the semi-conic wing 141 provides flexibility of being pressed against the body surface 110.

Similar to the semi-conic wing 141, a non-flexible solid wedge 151 with an extended wing profile is integrally molded together on the outer exterior body surface 110 at another location adjacent to the annular portion 123, opposite of the semi-conic wing 141. The solid wedge 151 includes a thin stripe of surface spanning the boundary perimeter. Explicitly, this thin stripe includes two inclined trussing edges 155 and 155' extending at an angle away from both the annular portion 123 and the body surface 110 at side edges. Thus formed, the trussing edge surfaces 155, 155' provide additional rigidity to the solid wedge 151. At the distal end, these trussing edges 155 and 155' change direction toward each other to meet and form a bottom ledge 156. Therefore, the thin stripe of surface including the trussing edges 155 and 155' and the bottom ledge 156 together define a recess 159 there between.

Figure 7:
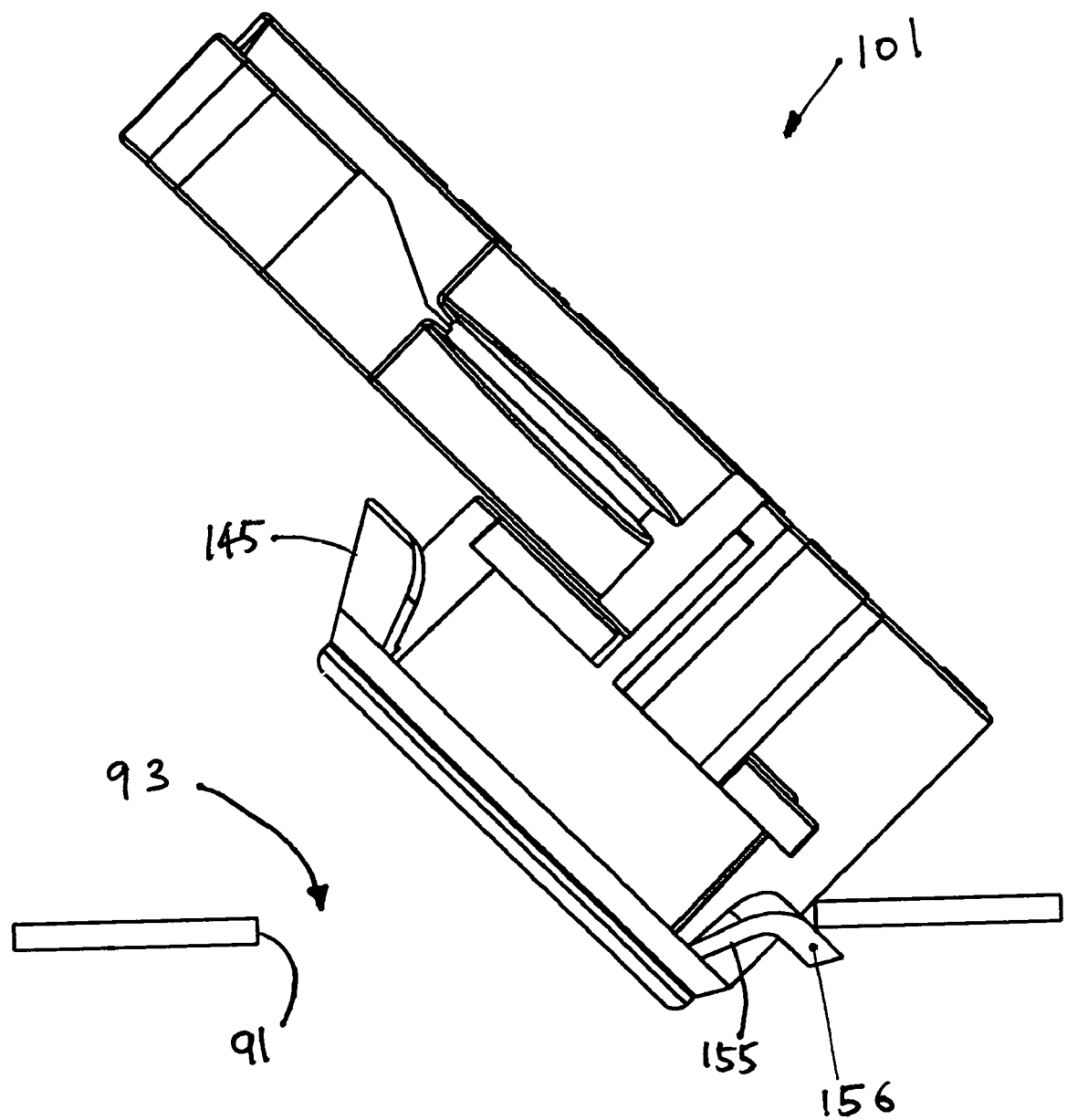
FIG. 7 is a side plan view of the preferred embodiment shown in FIG. 1 shown partially disposed inside a knockout hole.
Figure 8:
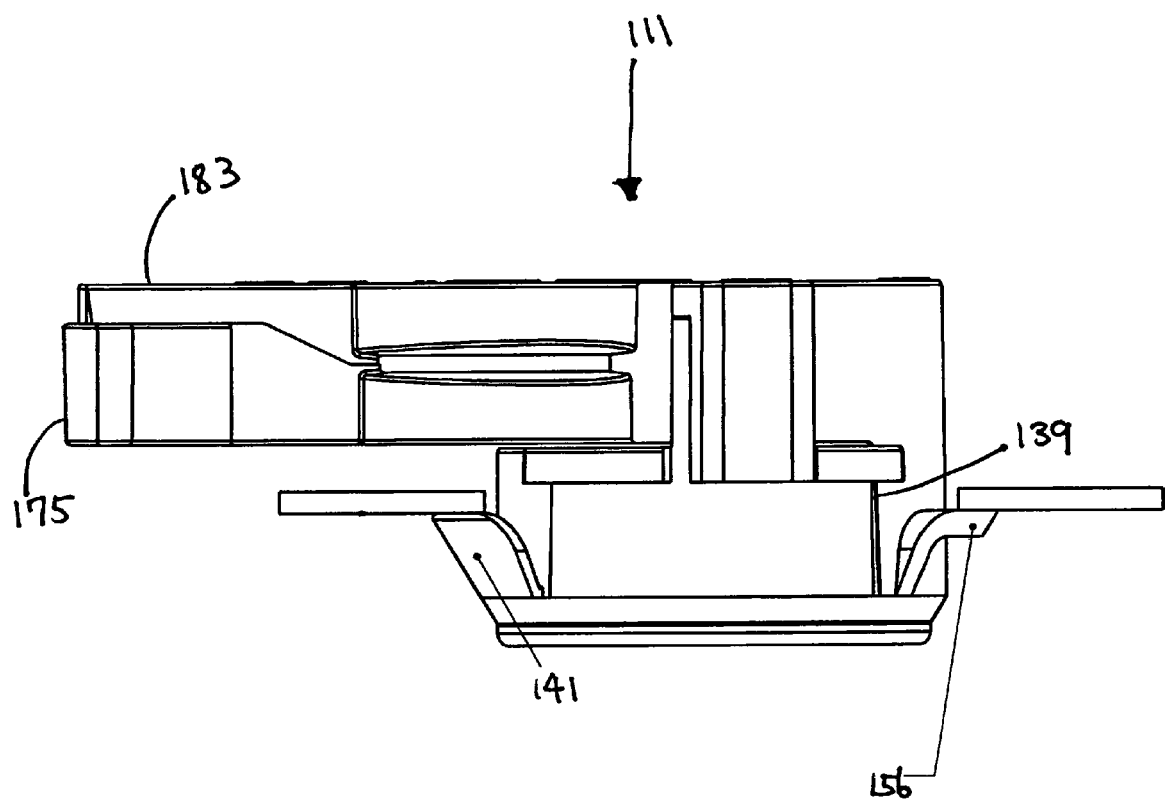
FIG. 8 is a side plan view of the embodiment of FIG. 7 shown fully inserted into the knockout hole.

Having discussed the front mounting end 121, the rear fastening end 161 shall now be discussed. A pair of spaced-apart planar segments or flange walls 131 and 133 extend radially outwardly of the body exterior surface 110 in substantially opposite directions. In addition, a stop shoulder 135 in the form of an extended protuberance projects radially outwardly close to the flange wall 133. Together, the flange walls 131, 133 and the stop shoulder 135 define a separation region for fastening end 161 from the mounting end 121. The flange walls 131, 133 and the stop shoulder 135 are provided with flat stop surfaces 132, 134, and 136 respectively so that the mounting end 121 may pass through the knock-out opening 93 (as shown in FIGS. 7 and 8) up to the area immediately adjacent flat stop surfaces 132, 134 and 136. Then, the flange walls 131, 133 and the stop shoulder 135 engage the rim of the knock-out opening 93. Thus fixed, the planar stop surfaces 132, 134 and 136 apply pressure on the rim of the knock-out opening 93 securely holding the body 101 therein.

Figure 3:
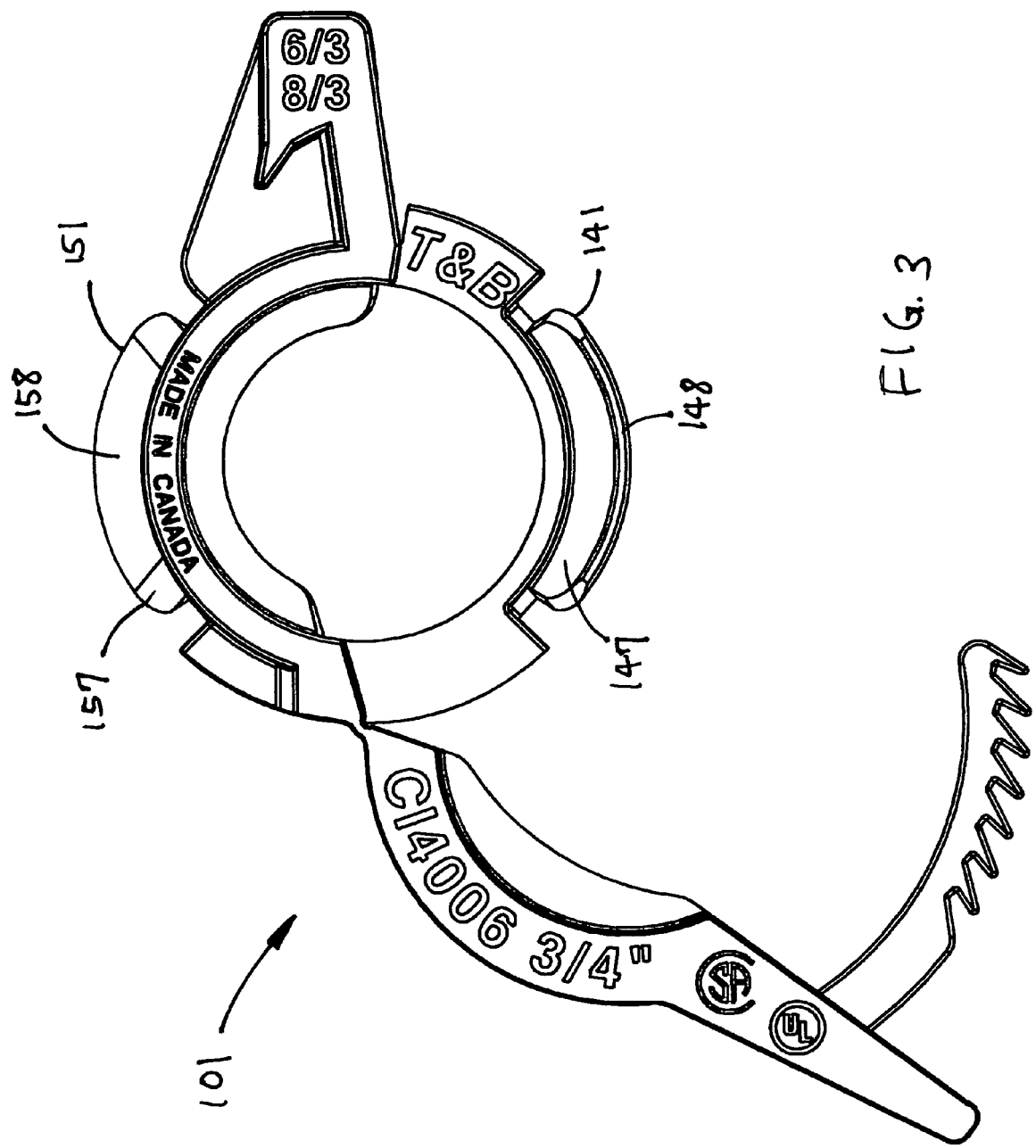
FIG. 3 is a rear plan view of another preferred embodiment with the rear pivoting segment in an open position.

As can be seen in FIG. 3, back end walls 147 and 157 of the flexible semi-conic wing 141 and the non-flexible solid wedge 151 define the opposite sides of the inclined surfaces 145, 155 and 155' respectively. More specifically, the back end walls 147 and 157 include planar surface portions 148 and 158. These planar surface portions 148 and 158 cooperate with the planar stop surfaces 132, 134 and 136 to provide a firm gripping mechanism when the semi-conic wing 141 and the non-flexible solid wedge 151 are passed through the knock-out opening 93.

Figure 4:
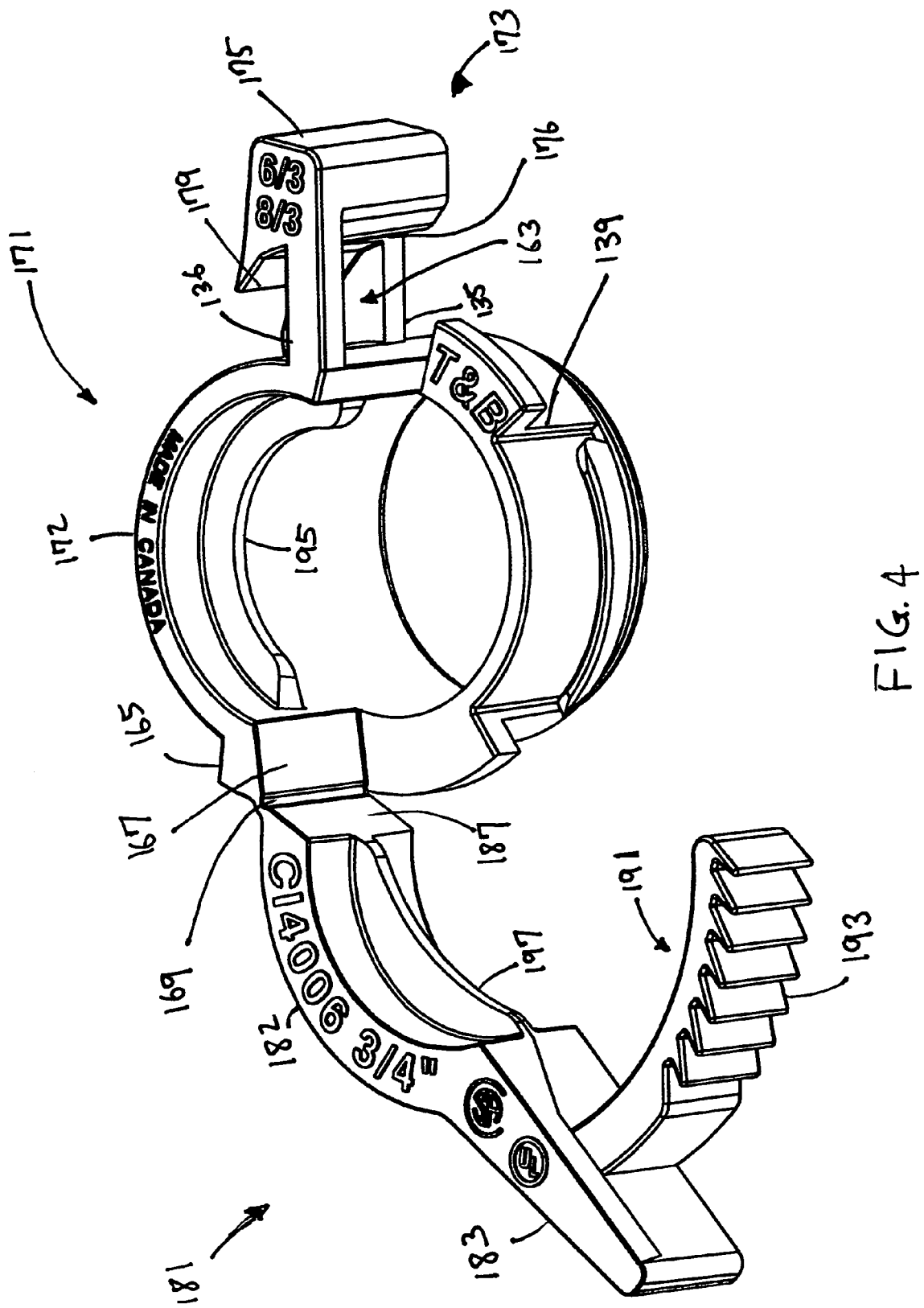
FIG. 4 is a rear perspective view of the preferred embodiment shown in FIG. 1.

In terms of additional functions with respect to FIG. 4, the planar surface portions 148 and 158 along with the planar stop surfaces 132, 134, and 136 together define a clearance body seat 139. This clearance body seat 139 provides a snap fit on either circumferential rim sides of the knock-out opening 93 provided on the junction box. Thus formed, the frontal annular portion 123 of the cable connector 101 can be applied to the junction box either before or after the cable 99 is applied to the connector, though as a matter of convenience, application of the empty body connector 101 to the box is preferred.

The complementary assembly of the rear fastening end 161 shall now be discussed. As can be seen in FIG. 4, the rear fastening end 161 is formed of two half-cylindrical bodies. The first part is a fixed part 171 having an arcuate segment 172 integrally formed with the mounting end 121 and extending halfway around a circumference parallel to the perimeter of the frontal annular portion 123. This fixed part 171 is designed to cooperate with a second pivoting part 181. The fixed part 171 includes a projection 173 provided radially outwardly perpendicular to the exterior surface 110. While the projection 173 is provided at a distal end portion of the arcuate segment 172, a reinforced hinge portion 165 is provided at opposite distal end. The reinforced hinge portion 165 provides a flattened surface 167 that cooperates with a flattened surface 187 of the pivoting part 181 and includes a hinge 169 running parallel to the direction of the axis 95 (FIG. 6).

The projection 173 of the fixed part 171 includes a boxlike cubic handle 175 attached to the distal end portion of the arcuate segment 172 at two distinctive bases. Explicitly, the stop shoulder 135 extends further toward the cubic handle 175 to define the first base. Another radially extending narrow shaft 136 provided at a distance close to the stop shoulder 135 forms a second base for attaching the boxlike cubic handle 175. These two distinctive bases, the stop shoulder 135 and the narrow shaft 136 together define a gap slot 163 formed there between to engage a portion of the pivoting part 181.

The boxlike cubic handle 175 includes several important features. The side of the cubic handle 175 facing the exterior surface 110, is sloped in an angle to define a guiding portion 176 that extends to a sharp edge-shaped, positively locking ledge nub 179. The ledge nub 179 juts inwardly for receiving and engaging a portion of the pivoting part 181.

In addition, once the ledge nub 179 engages the portion of the pivoting part 181, the boxlike cubic handle 175 can be pulled back to unlock and release the portion of the pivoting part 181 so that it can be pulled away from the fixed part 171. Thus, the cubic handle 175 serves to release the pivoting part 181 from the slot for removing/repositioning of the cable and also for reusing the cable connector. Further, the boxlike cubic handle 175 may be solid or it may preferably include an aperture 178 there within as shown in FIG. 2.

Having discussed the fixed part 171 of the fastening end 161, the pivoting part 181 shall now be discussed in detail. The pivoting part 181 is conjoined at the hinge 169 with the fixed part 171. The pivoting part 181 includes an arcuate segment 182 formed with a curved body corresponding to approximately half of the circumferential perimeter of the frontal annular portion 123. One end of the arcuate segment 182 is conjoined at the hinge 169 with the reinforced flattened surface 187. This flattened surface 187 cooperates with the flattened surface 167 of the hinge portion 165.

An extended shank handle 183 is provided at the other distal end of the arcuate segment 182 opposite the flattened surface 187. The extended shank handle 183 has an elongated body which narrows slightly for easy gripping. In addition, a slightly curved toothed rack 191 juts out from a location between either ends of the shank handle 183 in a direction perpendicular to a plane that bisects the shank handle 183. The toothed rack 191 includes a plurality of notches 193 shaped in series to pass through the slot 163 along the angled guide 176 and positively engage the ledge nub 179 to provide a series of possible fixed engagement positions with a varying degree of tightness.

The toothed rack 191 is shaped with a semi-rigid material to bend slightly as the notches 193 are passed over the ledge nub 179 but to retain the whole rigid shape of the pivoting part 181. In essence, the two parts 171 and 181 are shaped so that a user can squeeze the shank handle 183 and the cubic handle 175 with a thumb and an index finger by a simple squeezing torque movement. Such simple movement actuates the perpendicularly directed toothed rack 191 to move in tandem with the shank handle 183 and enter and pass through the slot 163. In turn, the notches 193 slide along the guide 176 and positively lock in series with the ledge nub 179 at different positions. Thus, the simple squeezing allows the user to configure a custom cable/wire retaining diameter.

The numerous engaging positions provided by the plurality of notches 193 allow additional functional benefits. The positions between the notches 193 and the ledge nub 179 translate to a plurality of positions between the shank handle 183 and the cubic handle 175. The widest position between the two handles 175 and 183 provides a wide enough passageway 111 for a cable diameter limited only by the diameter of the frontal annular portion 123. The narrowest position between the pivoting part 181 and the fixed part 171 allow the two handles 175 and 183 to abut against each other. Further, at certain positions closer to the narrowest position, the arcuate segment 182 and the arcuate segment 172 together form a series of circular diameter smaller than the diameter of the frontal cylindrical portion 123 to accommodate different diameters of cables, wires or a plurality thereof or change the cable number or diameter configuration at different installation instances.

Figure 5:
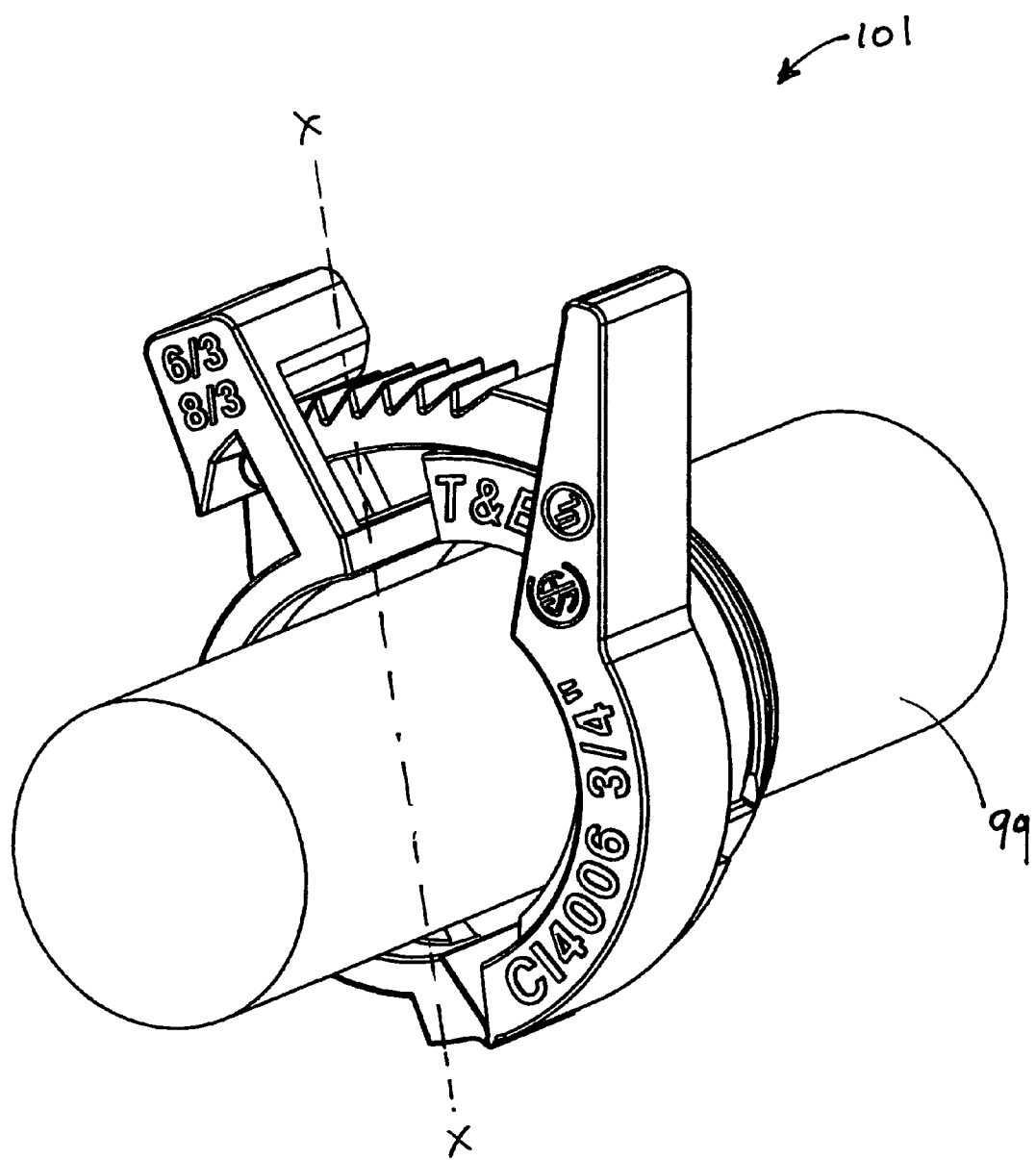
FIG. 5 is a rear perspective view of the preferred embodiment as shown in FIG. 1 with the rear pivoting segment in a closed position and including a partial view of a cable placed therein.

Preferably, as an ordinary person skilled in the art will recognize, the cable grasping function can be enhanced by several different designs to provide weather proofing. For instance, the inner perimeter of the arcuate section 182 of the pivoting part 181 may include a wedge-shaped cuneus 197 directed inwardly toward the center of the passageway 111. Further, the arcuate segment 172 of the fixed part 171 may also include a wedge shaped cuneus 195 directed inwardly to provide a hermaphroditical interaction with the cuneus 197 to firmly grasp the perimeter of the cable as shown in FIG. 5 and allow weather-proof functionality. As the arcuate segments 172 and 182 are brought together, the cuneus 195 and the cuneus 197 tightly clasp the cable there through to provide a gap-less rear portion of the circular opening passageway 111. Thus positioned, the cuneuses 195 and 197 provide a weatherproof tight seam preventing infiltration of dust or debris from outer environment into the box. Preferably, the cuneuses 195 and 197 may be fabricated with specific dimensions extending inwardly to a specified preferred length to adapt to different diameter wire or cable or bundles thereof.

Alternatively, a person of ordinary skill in the art will immediately recognize that the rigidity of the solid wedge 151 can be achieved by many different design deviations. For instance, the solid wedge 151' can be formed as a simple solid wedge with no recess therein.

The present invention also embodies several different features which may differ from the features described above. For instance, the pivoting part may be completely detachable from the cable connector itself and include a toothed rack on both sides to engage two slots on the fixed part. Further, the latched segment may include tightening means such as latches instead of toothed rack on either ends of the arcuate segment, configured to plug into the fixed slot segments. Alternatively, the pivoting latch segment may be an elongated wrap member positioned to circumscribe over the cable when positioned through the fixed slot segment. Furthermore, the fixed slot segment may include an adjustable quick snap lock for passing through and pivoting over a loop formed at the latch segment to circumscribe around the cable when positioned in the fixed slot segment.

In terms of materials, the cable connector body 101 may be integrally molded from an electrically insulating material such as a polymer, or preferably formed from a suitable electrically insulating plastic material such as ABS (acrylonitrile-butadiene-styrene), or the modified phenylene oxide that is sold under the trademark NORYL (by General Electric Co.). However, any suitable plastic material may be used, and furthermore the connector can be readily adapted to be made from suitable metallic materials such as die cast zinc or aluminum, ferrous castings, or non-ferrous metals.

Installation

Having described the physical attributes of the cable connector, a preferred installation method shall be described. As can be seen in FIG. 7, the cable connector 101 is installed in a knock-out opening 93 on a junction box to protect the conductor cable from the outer edges of the knock-out opening 93 and retain the conductor cable within.

The electrician mounts the mounting end 121 of the cable connector 101 into the knock-out opening 93. This is done by inserting the semi-conic wing and the solid wedge of the annular frontal portion 123 through the knock-out opening 93 to hold the cable connector body 101 within.

As a first step, the electrician inserts the non-flexible solid wedge 151 of the connector body 101 first into the knock-out opening 93 from the outside of the box. In detail, the bottom ledge 156 of the non-flexible solid wedge 151 is first inserted into the knock-out opening 93 from outside of the box wall.

Once the non-flexible solid wedge 151 passes through the knock-out opening 93, the flexible semi-conic wing 141 is pressed through the knock-out opening 93. As the flexible semi-conic wing 141 is made from resiliently flexible material, it is easily deflected as it is inserted into the opening 93. Thus, the rim portion 91 of the knock-out opening 93 will pass and end its contact with the surfaces 145.

As the semi-conic wing 141 returns to its relative position of FIG. 8 after it is deflected and then released, the clearance body seat 139 engages the knock-out opening 93 for a secure attachment.

The operator then readily inserts a cable through the bore 111 of the body 101 to a desired amount of cable length within the box. After the cable insertion, it is merely necessary to pivot the shank handle 183 toward the cubic handle 171 to secure the cable to the connector. The pivoting part 181 is readily applied to the connector body 101 by directing the toothed rack 191 through the opening slot 163 in the manner that has been indicated over the ledge nub 179. When the pivoting part 181 is in the position shown in FIG. 5, it firmly grasps cable 99 thereto. In addition, further latching, readjusting, and tightening of the shank handle against the slot segment is possible.

When it becomes necessary to remove or change the position of the cable, the connector is released by bending the cubic handle 175 and unlatching the pivoting part 181 away from the fixed part 171.

While the connector or fitting of this invention is intended for use in connection with the familiar knock-out openings of conventional boxes, the connector is also readily adapted for use in connection with box or other openings of standard knock-out size that are punched or drilled, whether in the field or otherwise. Of course, the fitting of this invention can be proportioned for use in connection with any size knock-out or otherwise formed box wire receiving opening. The box may be any conventional electrical box, such as the familiar outlet and switch boxes.

Various changes to the foregoing described and shown structures will now be evident to those skilled in the art. Accordingly, the particularly disclosed preferred embodiments are intended in an illustrative and not in a limiting sense. The scope of the invention is set forth in the following claims.

What is claimed is:

1. An apparatus comprising:
   a frontal portion provided on a plane perpendicular to an axis with a readily insertable undivided annular structure having a set of outer semi-conic wings that secures the apparatus to a knock-out opening prior to a cable insertion therein;
   an inner passageway for passing a cable in a direction that is parallel to said axis; and
   a rear grasping portion separated into a pivoting semi-rigid latch segment with a tightening handle and a fixed slot segment with a releasing handle for circumferentially grasping the inserted cable.

2. An apparatus according to claim 1, wherein a first cuneus is provided along the inner perimeter of said latch segment and a second cuneus is provided on said slot segment.

3. An apparatus according to claim 1, wherein said outer semi-conic wing is divided into a rigid solid semi-conic wedge and a flexible elongated semi-conic wing.

4. A process for inserting a cable into a knock-out junction box, the steps comprising:
   inserting a set of semi-conic wings formed adjacent to an annular frontal portion of a cable connector through a knock-out opening to hold said cable connector within said knock-out opening;
   inserting a desired length of a cable through an inner passageway of said annular frontal portion;
   pivoting a tightening handle of a rigid latch segment forming a part of a rear grasping portion of said cable connector against a fixed slot segment with a releasing handle to clasp and grasp the inserted cable; and
   further latching and tightening said latch segment against said slot segment.

5. A process according to claim 4, the process further comprising the step of: releasing by pulling said releasing handle and unlatching by pulling said latch segment away from said slot segment.

6. A cable connector for providing strain relief attachment of a cable within a knock-out opening through a wall of an electrical enclosure comprising:
   a one-piece generally annular body defining a cable passageway therethrough;
   said body having an annular forward portion for insertion through said knock-out opening and including attachment wings for engagement with one side of said enclosure wall;
   said body further including an annular rearward portion having a fixed semi-annular segment and a movable semi-annular segment, said movable segment being pivotally attached to one end of said fixed segment and being adjustably attached to the other end of said fixed segment so as to circumferentially compressibly engage said cable inserted therebetween and provide said strain relief thereabout.

7. A cable connector of claim 6 wherein said attachment wings include at least one solid wing and at least one flexible wing for resiliently securing said body to said wall of said enclosure.

8. A cable connector of claim 7 wherein said wings are arcuate.

9. A cable connector of claim 6 wherein said movable segment is pivotably attached to said fixed segment by an integral hinge.

10. A cable connector of claim 9 wherein said fixed segment includes a first handle having a slot therethrough and wherein said movable segment has a second handle having an extending projection which is insertable into the slot of said fixed segment.

11. A cable connector of claim 10 wherein said extending projection includes a toothed rack and wherein said slot includes a rib for adjustable engagement with said toothed rack.

12. A cable connector of claim 11 wherein said first handle is deflectable to release said toothed rack from said slot.

13. A cable connector of claim 11 wherein said second handle is configured to move in tandem with said toothed rack.

14. A cable connector of claim 6 wherein said body is formed from an electrically insulative material.

15. A cable connector of claim 6 wherein said fixed segment and said movable segment each include a cuneus structure thereon for engagement with said cable.

* * * * *